United States Patent [19]

Frank

[11] 4,371,797

[45] Feb. 1, 1983

[54] CIRCUIT FOR DECREASING THE EFFECT OF PARASITIC CAPACITANCES IN FIELD EFFECT TRANSISTORS USED IN COUPLING NETWORKS

[75] Inventor: Dieter Frank, Darmstadt-Eberstadt, Fed. Rep. of Germany

[73] Assignee: Robert Bosch GmbH, Stuttgart, Fed. Rep. of Germany

[21] Appl. No.: 145,318

[22] Filed: Apr. 30, 1980

[30] Foreign Application Priority Data

May 4, 1979 [DE] Fed. Rep. of Germany ....... 2917989

[51] Int. Cl.³ .................. H03K 17/16; H03K 17/693; H04N 5/21; H04Q 3/52
[52] U.S. Cl. ................................ 307/577; 307/242; 307/542; 307/575; 307/243; 358/167; 370/6
[58] Field of Search ............... 307/572, 575, 576, 577, 307/443, 241, 242, 243, 244, 571, 578, 584, 542, 546, 468; 370/6; 358/36, 167

[56] References Cited

U.S. PATENT DOCUMENTS

| | | | |
|---|---|---|---|
| 3,558,921 | 1/1971 | Yokozawa et al. | 307/577 |
| 3,657,575 | 4/1972 | Taniguchi et al. | 307/575 |
| 3,892,925 | 7/1975 | Fisk et al. | 370/6 X |
| 3,946,151 | 3/1976 | Kamiyama | 358/167 X |
| 4,067,046 | 1/1978 | Nakatani et al. | 358/167 X |

FOREIGN PATENT DOCUMENTS

| | | | |
|---|---|---|---|
| 1922382 | 11/1970 | Fed. Rep. of Germany | 307/577 |
| 2123395 | 11/1972 | Fed. Rep. of Germany | 307/577 |

*Primary Examiner*—Larry N. Anagnos
*Attorney, Agent, or Firm*—Frishauf, Holtz, Goodman & Woodward

[57] ABSTRACT

The loading due to parasitic capacitances on the input amplifiers of a coupling network which connects a plurality of input lines each including one of the input amplifiers selectively to a plurality of output lines and which uses field effect transistors as coupling elements is improved by the use of compensation amplifiers. Specifically, the source of each FET is connected to one of the input lines, while the drain is connected to an output line. Each compensation amplifier has an input connected to one output line and an output connected to the bulk terminal of each FET having a drain connected to the particular output line. Since the gain of the compensation amplifiers is unity, the voltage applied to the bulk terminals is equal to the output voltage shifted by the drain-bulk voltage.

7 Claims, 1 Drawing Figure

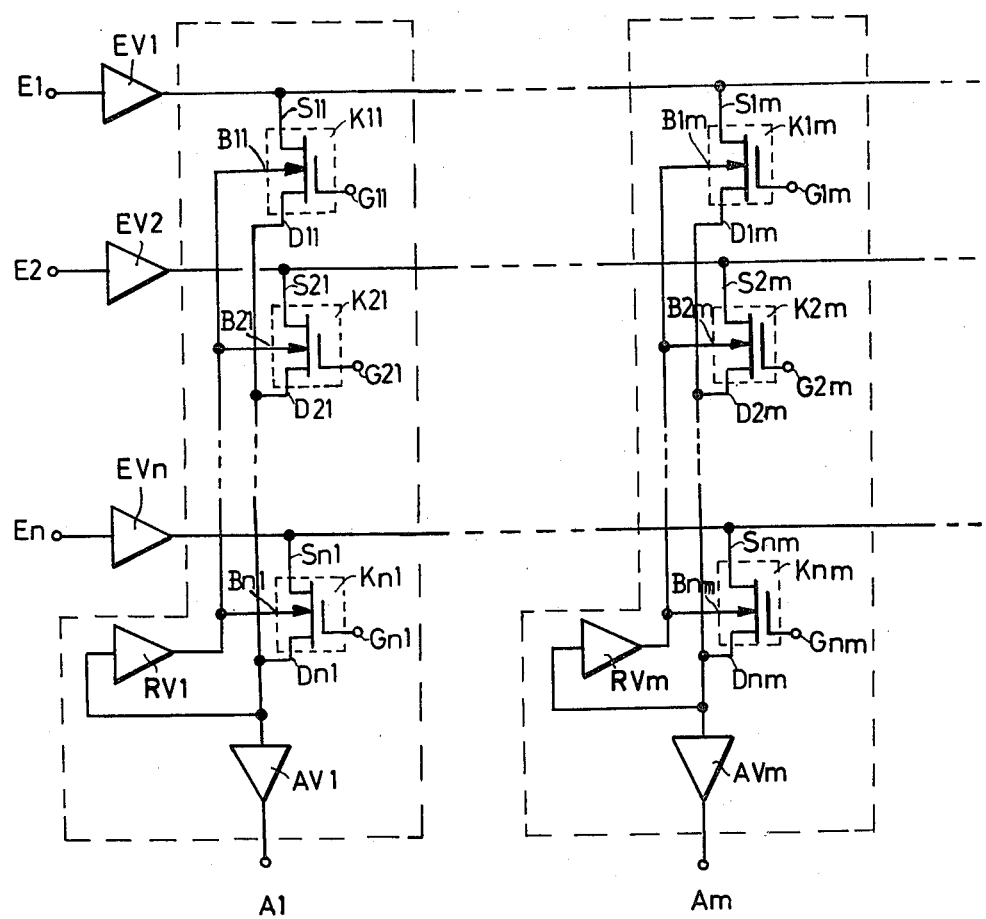

CIRCUIT FOR DECREASING THE EFFECT OF PARASITIC CAPACITANCES IN FIELD EFFECT TRANSISTORS USED IN COUPLING NETWORKS

The present invention relates to electronic coupling networks for selectively switching the signal on each of a plurality of input lines to one or more of a plurality of output lines. It relates specifically to coupling networks utilizing field effect transistors as the coupling elements.

BACKGROUND AND PRIOR ART

Coupling networks are known in which the switching elements at each of the input line-output line connecting points are field effect transistors. Such an arrangement is described in DE-AS No. 19 22 382. Field effect transistors used as switches have a very high resistance in the blocked state which, at high frequencies, is limited mainly by the parasitic capacitance between the electrodes. To decrease the effect of these parasitic capacitances, the bulk terminal of each field effect transistor is, in known systems, connected to ground potential. However, under certain conditions, and particularly when the signals to be transmitted are high frequency signals such as, for example, video signals, difficulties arise when too many output lines are connected to one input line. Under these circumstances, a highly capacitive load is applied to the output of the input amplifiers.

To obviate the above-mentioned difficulty, a circuit is described in DE-AS No. 21 23 395, in which the bulk terminal of the field effect transistors is connected through a capacitor to ground potential when the field effect transistor is blocked, while it is ungrounded with respect to AC voltages when the field effect transistor is conductive. This is accomplished by use of an additional diode which is switched in accordance with the DC voltage applied to the gate of the FET. A compensation capacitor on the input side of each coupling point is switched to ground simultaneously with the switching of this additional diode. This capacitance is equivalent to the capacitance of the blocked FETs in a line, so that when a number of output lines are connected to one input amplifier, the capacitive loading on the latter remains substantially constant.

This allows the capacitive load on the input amplifiers to remain constant even when additional output lines are connected to the input line. However, it does not cause any decrease in the capacitance so that here, too, inductive disturbances may be transferred from the input line to the output line. Further, the arrangement is relatively expensive, since at each coupling point a number of additional switching elements must be supplied. This is of particular importance in larger coupling networks which then require a substantial number of additional components.

THE INVENTION

It is an object of the present invention to decrease the input capacitance as well as the changes in load capacitances for the input amplifiers, i.e. the amplifiers in the input lines of the coupling network. It is a further object of the present invention to accomplish this goal without a substantial increase in the required components. The decrease in the above-mentioned capacitances is to be sufficient to cause the frequency response and the crosstalk attenuation of the coupling network to be substantially improved.

In accordance with the present invention, a coupling network which comprises a plurality of input lines each having an input amplifier, a plurality of output lines, and a plurality of field effect transistors each having a source-drain circuit connected between one of said input lines and one of said output lines, a gate terminal and a bulk terminal is improved by means, such as an amplifier having unity gain, which apply a compensation voltage corresponding to the output voltage on one of said output lines to all of said bulk terminals of said field effect transistors. More specifically, the voltage on each output line is applied to the bulk connection of all FETs connected to that particular output line. When an output amplifier is connected in the output line, the output voltage can be derived either from the input or the output of the output amplifier. The compensation voltage then corresponds to the output voltage, or the amplified output voltage, shifted by the bulk-drain voltage of the FET.

DRAWING ILLUSTRATING A PREFERRED EMBODIMENT

The single FIGURE shows part of a coupling network utilizing FETs as coupling elements and including the improvement of the present invention.

The single FIGURE shows a coupling network which has a plurality of input lines E1, E2, . . . En and a plurality of output lines Al, . . . Am. An input amplifier EV1, . . . EVn is connected in each input line and an output amplifier AV1, . . . AVm in each output line. An FET constitutes the switching element at each crosspoint k11, . . . Knm arranged between each input line E1, . . . En and each of the output lines A1, . . . Am. Each input line can thus be selectively connected to each output line by application of a control signal to the gate G11, . . . Gnm of each FET. Each FET has a source electrode S11, . . . Snm connected to a corresponding one of the input lines E1, . . . En and a drain D11, . . . Dnm connected to one of the output lines. As mentioned before, the source-drain circuit of each FET is switched from the blocked to the conductive state by application of the control signal to the corresponding gate terminal. The bulk terminals B11 . . . Bn1; . . . B1m . . . Bnm of all FETs connected to each output line are connected to the output of an amplifier RV1, . . . RVm whose input is connected to either the input (as shown) or the output of the output amplifier in the same output line.

OPERATION

Signals to be switched, for example video signals, are present at input lines E1, . . . En and are applied through input amplifiers EV1, . . . EVn to the crosspoint switching elements K11, . . . Knm. If now the signal of a selected input line is to be applied to one or more output lines, then the control signal from a low impedance voltage source is applied to the gate terminal of all of the FETs constituting the switching elements disposed between the input line and the one or more output lines. The affected FET becomes conductive so that a connection is formed between the input line and the one or more output lines by the source-drain electrode(s) of the conductive FETs. An output signal corresponding to the input signal can then be found on the selected output lines.

As shown in the single FIGURE, the signal at the input of each output amplifier AV1 . . . AVm is applied to the input of a respective compensation amplifier. The output of each compensation amplifier is connected to the bulk terminals of all FETs having a drain connected to the particular output line. The compensation amplifier has a gain of unity and a low impedance output. The signal applied to the bulk terminals thus is a voltage substantially equal to the voltage on the output line both in phase and amplitude but shifted by an amount equal to the drain-bulk voltage $U_{DB}$.

The effect of parasitic capacity between the source and bulk as well as between the bulk and drain of the FETs is thereby eliminated. The load capacitance at the output of the input amplifier as well as changes in load capacitance when additional output lines are connected to the input line are substantially decreased, resulting in a great improvement in the transmission characteristic. In practice, the circuit of the present invention resulted in a reduction of load capacitance by a factor of 3.

The coupling network can be further improved if the control voltage applied to the gate terminals is supplied from a voltage source which has a low internal resistance. This causes the parasitic capacities between source and gate and gate and drain to be split, that is the series connection of these parasitic capacitances is removed so that a further attenuation of cross-talk results.

Various changes and modifications may be made within the scope of the inventive concepts.

I claim:

1. In a network for selectively coupling each of a plurality of input lines (E1 ... En) to a plurality of output lines (A1 ... Am), said coupling network comprising a plurality of field effect transistors each having a source-drain circuit connected between one of said input lines and one of said output lines, a gate terminal and a bulk terminal, said source-drain circuit switching to the conductive state in response to a control signal applied at said gate terminal, thereby providing an output signal on the associated one of said output lines in response to an input signal on the associated one of said input lines, the said output signal being derived from the signal transmitted across the respective source-drain circuit of the FET from the input line to the output line when the said FET is activated by said gate control signal, the improvement comprising means (RV1 ... RVm) connected to said bulk terminals and at least one of said output lines for applying a compensation signal to said bulk terminals of at least selected ones of said field effect transistors, said compensation signal being derived from said output signal on said at least one output line, and being applied in a form compensating and substantially reducing the effect of parasitic capacitance between said source-drain circuit and said bulk terminals of said field effect transistors.

2. A coupling network as set forth in claim 1, wherein each of said field effect transistors has a source electrode connected to one of said input lines and a drain connected to one of said output lines;
wherein each of said output lines is connected to the drains of a subgroup of said FET's, said subgroups being mutually exclusive;
wherein said output signal is an output voltage; and
wherein said compensation signal is a compensation voltage substantially equal to said output voltage shifted by the drain-bulk voltage of said field effect transistors.

3. A coupling network as set forth in claim 2, wherein said compensation signal applying means comprises a plurality of compensating amplifiers (RV1 ... RVm) having a low output impedance, each having an input connected to one of said output lines and an output connected to all of said subgroup of field effect transistors connected to said one of said output lines.

4. A coupling network as set forth in claim 3, further comprising a plurality of output amplifiers (AV1 ... AVm) each having an input connected to one of said output lines and an output furnishing an amplified output voltage.

5. A coupling network as set forth in claim 4, wherein said input of each of said compensating amplifiers is connected to said input of one of said output amplifiers.

6. A coupling network as set forth in claim 4, wherein the input of each of said compensation amplifiers is connected to the output of one of said output amplifiers.

7. A coupling network as set forth in claim 1, further comprising a source of gate control signals connected to each of said gate terminals, said source of gate control signals comprising a low impedance voltage source.

* * * * *